United States Patent
Hoseley et al.

(10) Patent No.: US 9,800,419 B2
(45) Date of Patent: Oct. 24, 2017

(54) CRYPTOGRAPHIC METHOD AND SYSTEM OF PROTECTING DIGITAL CONTENT AND RECOVERY OF SAME THROUGH UNIQUE USER IDENTIFICATION

(71) Applicant: EXPONENTIAL HORIZONS, LLC, Warrenville, IL (US)

(72) Inventors: Rantz Hoseley, Burbank, CA (US); Harry Thomas Kloor, Burbank, CA (US)

(73) Assignee: EXPONENTIAL HORIZONS, LLC, Warrenville, IL (US)

( * ) Notice: Subject to any disclaimer, the term of this patent is extended or adjusted under 35 U.S.C. 154(b) by 327 days.

(21) Appl. No.: 14/614,163

(22) Filed: Feb. 4, 2015

(65) Prior Publication Data

US 2015/0220756 A1    Aug. 6, 2015

Related U.S. Application Data

(60) Provisional application No. 61/935,630, filed on Feb. 4, 2014.

(51) Int. Cl.
*G06F 21/00* (2013.01)
*H04L 9/32* (2006.01)
(Continued)

(52) U.S. Cl.
CPC ............ *H04L 9/3263* (2013.01); *G06F 21/10* (2013.01); *G06F 21/335* (2013.01);
(Continued)

(58) Field of Classification Search
CPC . H04L 63/0823; H04L 9/3263; H04L 9/0825; H04L 9/0822
See application file for complete search history.

(56) References Cited

U.S. PATENT DOCUMENTS

| 2005/0131832 A1 | 6/2005 | Fransdonk ...................... 705/59 |
| 2007/0014399 A1 | 1/2007 | Scheidt et al. .................. 380/44 |

(Continued)

OTHER PUBLICATIONS

International Preliminary Report on Patentability issued in application No. PCT/US2015/014471, dated Aug. 18, 2016 (8 pgs).
(Continued)

*Primary Examiner* — Ghazal Shehni
(74) *Attorney, Agent, or Firm* — Hayes Soloway P.C.

(57) ABSTRACT

A computer-implemented method and related system controls access to protected content with certificate-based access authorization. Protected content stored in a memory of a computer is enciphered using a content key to produce a quantity of enciphered, protected content, wherein the content key is derived from a content encryption algorithm. A user key is derived from user credentials using a credential encryption algorithm. The content key is enciphered with the user key using a content key encryption algorithm to produce a certificate, wherein the certificate contains the enciphered content key. Access to the protected content is controlled by the user credentials and the certificate containing a second enciphered content key. A decryption user key is generated and access authorization to the protected content is determined based on the decryption user key in response to a match of the decryption user key with the user key.

21 Claims, 7 Drawing Sheets

(51) Int. Cl.
*H04L 9/08* (2006.01)
*G06F 21/10* (2013.01)
*G06F 21/33* (2013.01)

(52) U.S. Cl.
CPC .......... *H04L 9/0822* (2013.01); *H04L 9/0866* (2013.01); *H04L 2209/60* (2013.01)

(56) References Cited

U.S. PATENT DOCUMENTS

| | | | |
|---|---|---|---|
| 2010/0235633 A1* | 9/2010 | Asano | G06F 21/10 713/167 |
| 2013/0061035 A1* | 3/2013 | Hook | H04L 9/088 713/150 |
| 2014/0006781 A1 | 1/2014 | Corella et al. | 713/168 |

OTHER PUBLICATIONS

International Search Report and Written Opinion, issued in corresponding PCT International Patent Application Serial No. PCT/US15/14471, dated Oct. 23, 2015 (11 pages).

\* cited by examiner

CRYPTOGRAPHIC METHOD AND SYSTEM OF PROTECTING DIGITAL CONTENT AND RECOVERY OF SAME THROUGH UNIQUE USER IDENTIFICATION

CROSS REFERENCE TO RELATED APPLICATION

This application claims benefit of U.S. Provisional Application Ser. No. 61/935,630, entitled "Purely cryptographic method of protecting digital content, & recovery of same through unique user identification" filed Feb. 4, 2014, the entire disclosure of which is incorporated herein by reference.

FIELD OF THE DISCLOSURE

The present disclosure is generally related to protecting digital content and more particularly is related to a cryptographic method and system of protecting digital content & recovery of the same through unique user identification.

BACKGROUND OF THE DISCLOSURE

The ability to control access to digital content stored on a computer, a local server, or the cloud, among other places, is a critical requirement for most content providers. The content may include music, video, documents, corporate information, or other data which is retrievable using a computerized medium, such as a computer, tablet computer, smart phone, or another device. Often, the content is proprietary and intended to be accessed only by parties who have appropriate authorization. Authorized parties may include those who have obtained a license, e.g., when a user purchases entertainment media through an on-line service, or those who have authorization by virtue of their employment, e.g., an employee who accesses his or her employer's data. Various content protection schemes have been developed to prevent unauthorized parties from accessing the content.

FIG. 1 is a diagrammatical illustration of access authorization steps of a conventional content protection scheme 10, in accordance with the prior art. When authorizing a new user to access protected content or re-authorizing access for an existing user, the user presents one or more credentials 20 identifying the user. The credentials may include passwords, biographical information, hardware information, and other such identifying data or information. These credentials are presented to an authorization algorithm 30 which creates a certificate 40 that indicates what access is to be permitted to the protected content when the same credentials are presented in the future. The certificate 42 is then stored for future access. In some implementations, the protected content may be stored on the end-user system. In other implementations, the protected content may be stored on external media or at a location separate from the end-user system.

FIG. 2 is a diagrammatical illustration of a content access process of a conventional content protection scheme 10, in accordance with the prior art. The content protection scheme 10 of FIG. 2 is utilized by many existing digital content protection algorithms for enabling access to protected content. Credentials 20 can be presented by either the user or some other entity to security software 50, which accesses the previously saved certificate 40 and compares the credentials 20 to the certificate 40 to determine whether access should be allowed. If the credentials 20 are authorized by the certificate 40, the security software 50 authorizes access to the protected content 60. The user 70 can then access the protected content 60 in the manner prescribed by certificate 40.

In some existing implementations, the credentials 20 are simply recorded in the certificate 40 and access is allowed if the presented credentials 20 match exactly. More sophisticated implementations may store only data derived from the credentials 20 in order to prevent the recovery of the original credentials 20 from the certificate 40, which may provide varying levels of access to the protected content 60, and may permit access based only on a partial match.

These protection efforts have enjoyed some success, but they are increasingly susceptible to attacks by unauthorized parties who are able to exploit flaws in the protection schemes and ultimately gain access to the protected content. FIG. 3 is a diagrammatical illustration of a forged certificate attack 12 against a conventional content protection scheme 10 of FIGS. 1-2, in accordance with the prior art. Because the security software 50 is stored on a system under the user's control, an attacker who wishes to access the protected content 60 but lacks the proper credentials may mount a forged certificate attack using a forged certificate 80. In the forged certificate attack, the attacker creates a forged certificate 80, which is a new certificate that appears to authorize access for whatever credentials the attacker actually has. The attacker then replaces the original certificate 40 with this forged certificate 80, so that when the security software 50 examines the forged certificate 80, the attacker's credentials will appear to be authorized. FIG. 4 is a diagrammatical illustration of a bypass attack 14 against a conventional content protection scheme 10 of FIGS. 1-2, in accordance with the prior art. The bypass attack 14 of FIG. 4 may be an alternative to the forged certificate attack 12 of FIG. 3. In the bypass attack 14, the attacker can bypass the security software 50, or suppress its output, and access the protected content 60 directly, as depicted FIG. 4. The bypass attack 14 is the most common method of bypassing conventional content protection schemes 10 seen in the industry.

Thus, a heretofore unaddressed need exists in the industry to address the aforementioned deficiencies and inadequacies.

SUMMARY OF THE DISCLOSURE

Embodiments of the present disclosure provide a system and computer-implemented method of controlling access to protected content with certificate-based access authorization. In this regard, one embodiment of such a method, among others, can be broadly summarized by, executing on a processor, the following steps: enciphering a quantity of protected content stored in a memory of a computer using a content key to produce a quantity of enciphered, protected content, wherein the content key is derived from a content encryption algorithm; deriving a user key from a set of user credentials using a credential encryption algorithm; and enciphering the content key with the user key using a content key encryption algorithm to produce a certificate, wherein the certificate contains the enciphered content key.

In one aspect of the disclosure the content key is chosen by the provider of the quantity of protected content within constraints of the content encryption algorithm.

Another aspect of the disclosure comprises supplying the set of user credentials by the user. In such aspect supplying the set of user credentials by the user optionally further comprises using a cryptographic hash function.

In yet another aspect of the disclosure the certificate does not contain either the set of user credentials or the user key.

In still yet another aspect of the disclosure deriving the content key further comprises at least one of: providing the content key as a fixed key; and choosing the content key at a time of user authorization.

A further aspect of the disclosure comprises: presenting a second set of user credentials to a security program, wherein the security program is stored, at least partially, on the memory of the computer; presenting a second certificate containing a second enciphered content key to the security program; generating a decryption user key with the security program using the second set of user credentials presented; and determining access authorization to the quantity of enciphered, protected content based on the decryption user key. In such aspect determining access authorization to the quantity of enciphered, protected content based on the decryption user key preferably further comprises: decrypting the second enciphered content key with the decryption user key using a content key decryption algorithm in response to a match of the decryption user key with the user key; and decrypting a quantity of protected content with the decrypted content key using a content decryption algorithm, thereby providing user access to the quantity of protected content. Optionally, also, a match of the decryption user key with the user key further comprises a match of the set of user credentials with the second set of user credentials. In such aspect, the match of the decryption user key with the user key preferably further comprises a partial match of the set of user credentials with the second set of user credentials, wherein the partial match is based on a division of the enciphered content key into a plurality of shares, wherein the second enciphered content key matches at least a portion of the plurality of shares.

In one aspect, the content key decryption algorithm is stored within the second certificate.

In another aspect determining access authorization to the quantity of enciphered, protected content based on the decryption user key further comprises producing a substitute value in response to a non-match of the decryption user key with the user key. In such aspect the substitute value preferably does not decrypt the second enciphered content key, wherein access to the quantity of protected content is rejected. Also, the non-match of the decryption user key with the user key optionally may correspond to a non-match of the set of user credentials with the second set of user credentials.

Yet another aspect of the disclosure comprises obtaining the set of user credentials using a decision process based on an external value, wherein the external value is at least one of deterministic and random.

In still yet another aspect of the disclosure at least one of the content encryption algorithm, the credential encryption algorithm, the content key encryption algorithm, the content key decryption algorithm, and the content decryption algorithm utilizes at least one of: a hard disk serial number of the memory, a CPU serial number of the computer, a make of the computer, a model of the computer, a hardware key, a unique value derived from one or more device hardware and software characteristics, and an authentication server.

The present disclosure can also be viewed as providing computer-implemented methods of providing access to protected content with certificate-based access authorization. In this regard, one embodiment of such a method, among others, can be broadly summarized by, executing on a processor, the following steps: presenting a set of user credentials to a security program, wherein the security program is stored, at least partially, on a memory of a computer; presenting a certificate containing an enciphered content key to the security program; generating a user key with the security program using the set of user credentials presented; decrypting a content key with the user key using a content key decryption algorithm, wherein the content key decryption algorithm is stored within the certificate; and decrypting a quantity of protected content with the decrypted content key using a content decryption algorithm, thereby providing user access to the quantity of protected content. Such aspect preferably optionally comprising decrypting the content key with the user key using the content key decryption algorithm in response to a match of a previously decrypted user key with the user key.

The present disclosure can also be viewed as providing a non-transitory computer-readable medium for controlling access to protected content stored on a memory of a computer with certificate-based access authorization, comprising instructions stored on the memory. Briefly described, in architecture, one embodiment of the computer-readable medium, among others, can be implemented as instructions executed on a processor to perform the steps of: enciphering a quantity of protected content stored in a memory of a computer using a content key to produce a quantity of enciphered, protected content, wherein the content key is derived from a content encryption algorithm; deriving a user key from a set of user credentials using a credential encryption algorithm; and enciphering the content key with the user key using a content key encryption algorithm to produce a certificate, wherein the certificate contains the enciphered content key.

In another aspect of the disclosure, the non-transitory computer-readable medium further comprises the steps of: presenting a second set of user credentials to a security program, wherein the security program is stored, at least partially, on the memory of the computer; presenting a second certificate containing a second enciphered content key to the security program; generating a decryption user key with the security program using the second set of user credentials presented; and determining access authorization to the quantity of enciphered, protected content based on the decryption user key by: decrypting the second enciphered content key with the decryption user key using a content key decryption algorithm in response to a match of the decryption user key with the user key; and decrypting a quantity of protected content with the decrypted content key using a content decryption algorithm, thereby providing user access to the quantity of protected content.

In another aspect of the disclosure the first and second keys are themselves protected by at least one other set of credentials.

The instructions executed on the processor may further include: presenting a second set of user credentials to a security program, wherein the security program is stored, at least partially, on the memory of the computer; presenting a second certificate containing a second enciphered content key to the security program; generating a decryption user key with the security program using the second set of user credentials presented; and determining access authorization to the quantity of enciphered, protected content based on the decryption user key by: decrypting the second enciphered content key with the decryption user key using a content key decryption algorithm in response to a match of the decryption user key with the user key; and decrypting a quantity of protected content with the decrypted content key using a content decryption algorithm, thereby providing user access to the quantity of protected content.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 5:
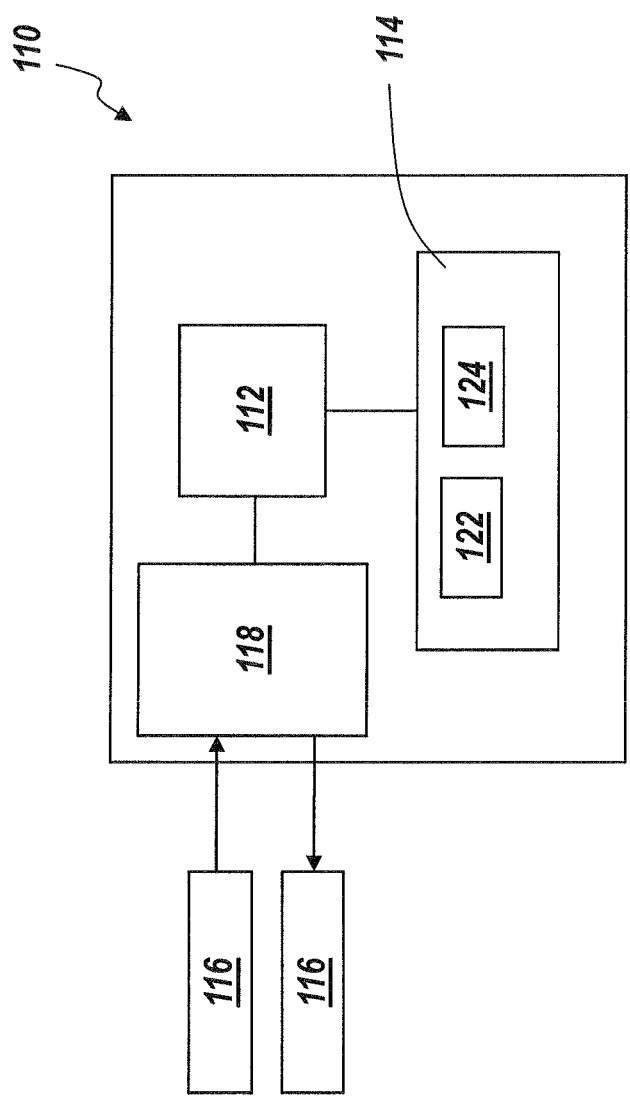
FIG. 5 is a schematic illustration of a general-purpose computer for use with the computerized device, in accordance with a first exemplary embodiment of the present disclosure.

FIG. 5 is a schematic illustration of a general-purpose computer 110, in accordance with a first exemplary embodiment of the present disclosure. The general-purpose computer 110, which may be referred to simply as 'computer 110' herein, may include any components, in whole or in part, commonly used with a computer, but may also include a variety of additional components. Accordingly, the computer 110 of FIG. 5 is to provide clarity in describing the general functioning of a computing system and is not considered limiting to the present disclosure.

The computer 110 may include a variety of computer-based components, in whole and in part. For example, the computer 110 may be implemented in software (e.g., firmware), hardware, or a combination thereof. Commonly, the computer 110 is implemented with both hardware and software, such as a hard drive or memory that stores processor-executable code portions for carrying out instructions, calculations, or other tasks. The software or programmable code may be executed by any special or general purpose digital computer, such as a personal computer, workstation, minicomputer, smart phone, tablet computer, or mainframe computer.

In terms of hardware architecture, as is shown in FIG. 5, the computer 110 includes a processor 112, database 114, and one or more input and/or output (I/O) devices 116 (or peripherals) that are communicatively coupled via a local interface 118 (I/O interface). The local interface 118 can be, for example but not limited to, one or more buses or other wired or wireless connections, as is known in the art. The local interface 118 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 112 is a hardware device for executing software, particularly that stored in the database 114. The processor 112 can be any custom made or commercially available processor, a central processing unit (CPU), an auxiliary processor among several processors associated with the computer 110, a semiconductor based microprocessor (in the form of a microchip or chip set), a macroprocessor, or generally any device for executing software instructions. The database 114, which may often be referred to as 'memory,' can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the database 114 may incorporate electronic, magnetic, optical, and/or other types of storage media. Note that the database 114 can have a distributed architecture, where various components are situated remote from one another, but can be accessed by the processor 112. For example, the database 114 may have a partitioned drive for storage of data in separate and distinct areas with communication therebetween through the processor 112.

The software in the database 114 may include one or more separate programs, each of which comprises an ordered listing of executable instructions for implementing logical functions. In the example of FIG. 5, the software in the database 114 may include an operating system (O/S) 122, which manages computer hardware resources and provides common services for execution of various software applications 124. The operating system 122 may control the execution of other computer programs, namely software applications 124, and provides scheduling, input-output control, file and data management, memory management, and communication control and related services. The software applications 124 may include any type of computer program or software that is installed, downloaded, or otherwise stored, at least in part, in the database 114. Software applications 124 may include activity or function-specific programs and general functioning programs.

The software application 124 on the computer 110 may include a source program, executable program (object code), script, or any other entity comprising a set of instructions to be performed. When a source program is included, the program may need to be translated via a compiler, assembler, interpreter, or the like, which may or may not be included within the memory 114, so as to operate properly in connection with the O/S 122. Furthermore, the software application 124 may be written in an object oriented programming language, which has classes of data and methods, or written in a procedural programming language, which has routines, subroutines, and/or functions, or written in any other method of providing instructions to a computer now known or hereinafter invented.

The I/O devices 116 may include input devices, for example but not limited to, a keyboard, mouse, scanner, microphone, communication connection, touch-sensitive device, gesture recognition device, voice recognition device, or other computerized device, etc. Furthermore, the I/O devices 116 may also include output devices, for example but not limited to, a printer, display, etc. The I/O devices 116 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

The computer 110 can include software applications 124 which can be stored on any computer readable medium for use by or in connection with any computer related system or method. In the context of this document, a computer readable medium is an electronic, magnetic, optical, or other physical device or means that can contain or store a computer program for use by or in connection with a computer related system or method. The computer 110 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

It is noted that the computer 110 may be a single unitary device having the various components housed therein, or a plurality of interconnected devices connected through a communication connection. Communication connections may include wired connections, wireless connections, connections through other devices (servers), and connections through a network. For example, a plurality of computers 110 may be connected together via a network connection such as the Internet, an extranet, or any other cloud-based network where communication is facilitated. The components of the computer 110, such as the memory 114, may be housed and/or stored remotely from the processor 112, or other components, and communicate through a network connection. Any configuration of the components of the computer 110 may be possible.

Figure 6:
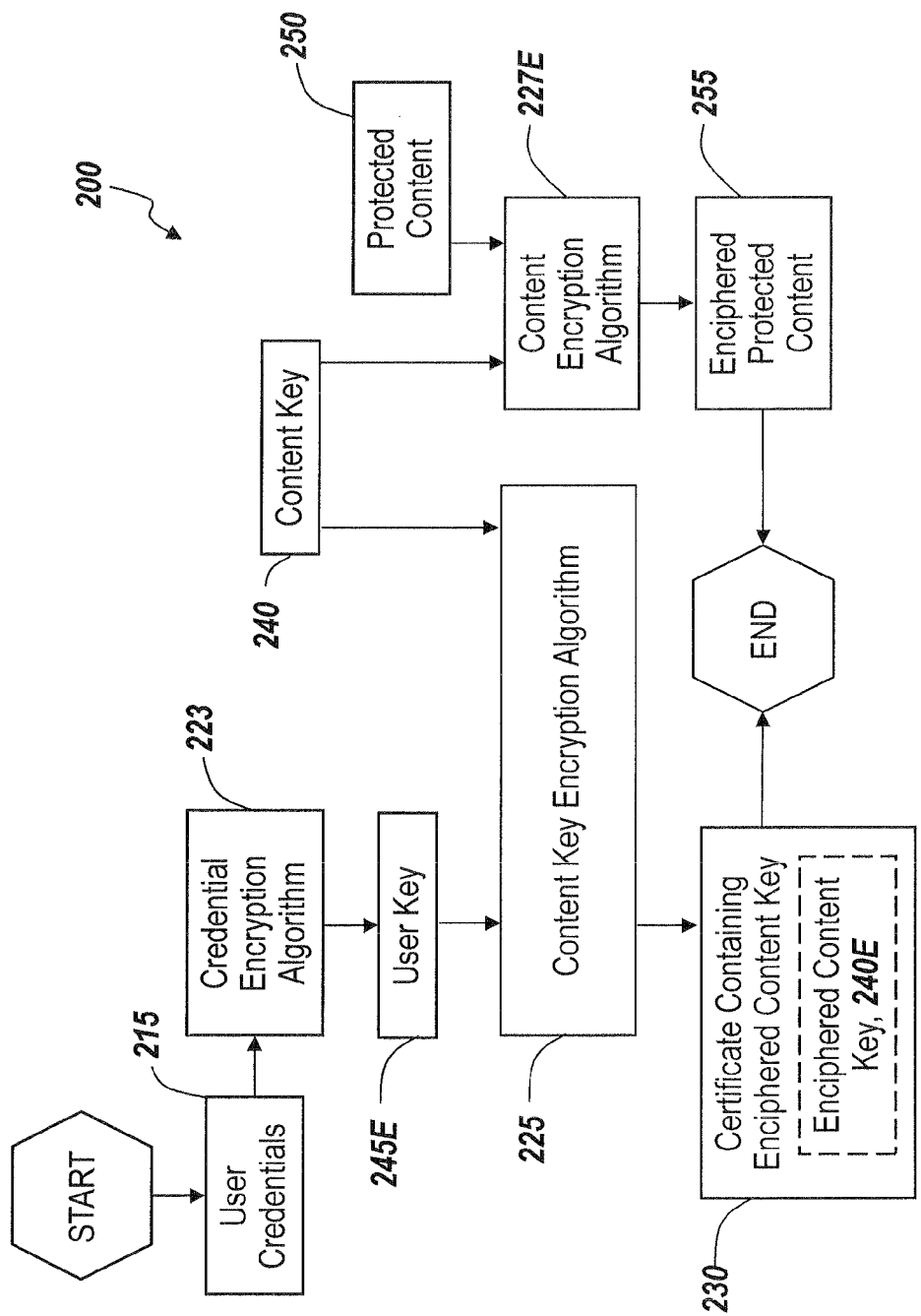
FIG. 6 is a diagrammatical illustration of a computer-implemented method of controlling access to protected content with certificate-based access authorization, in accordance with the first embodiment of the present disclosure.

FIG. 6 is a diagrammatical illustration of a computer-implemented method of controlling access to protected content 200 with certificate-based access authorization, in accordance with the first embodiment of the present disclosure. It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

The computer-implemented method of controlling access to protected content 200, which may be referred to herein simply as 'access authorization method 200' includes a number of steps executed on a processor of a computer. As is shown in FIG. 6, a quantity of protected content 250 stored within a memory of the computer is enciphered using a cryptographic key, which referred to as content key 240, resulting in a quantity of enciphered, protected content 255. The content key 240 is derived from a content encryption algorithm 227E which is applied to the quantity of protected content 255 using content key 240, thereby generating the quantity of enciphered, protected content 255.

The access authorization method 200 further includes a second cryptographic key, referred to as a user key 245E, which is derived from a set of user credentials 215 using a credential encryption algorithm 223. As used herein "user credentials" can include not just a user name/password but also possibly a nonce or even a digital signature. The content key 240 is then, itself, enciphered with the user key 245E using a content key encryption algorithm 225 to produce a certificate 230. The certificate 230 contains enciphered content key 240E. The certificate 230 contains the ciphertext resulting from the enciphering of the content key 240 with the user key 245E, but it does not contain the original set of user credentials 215 or the user key 245E.

Figure 7:
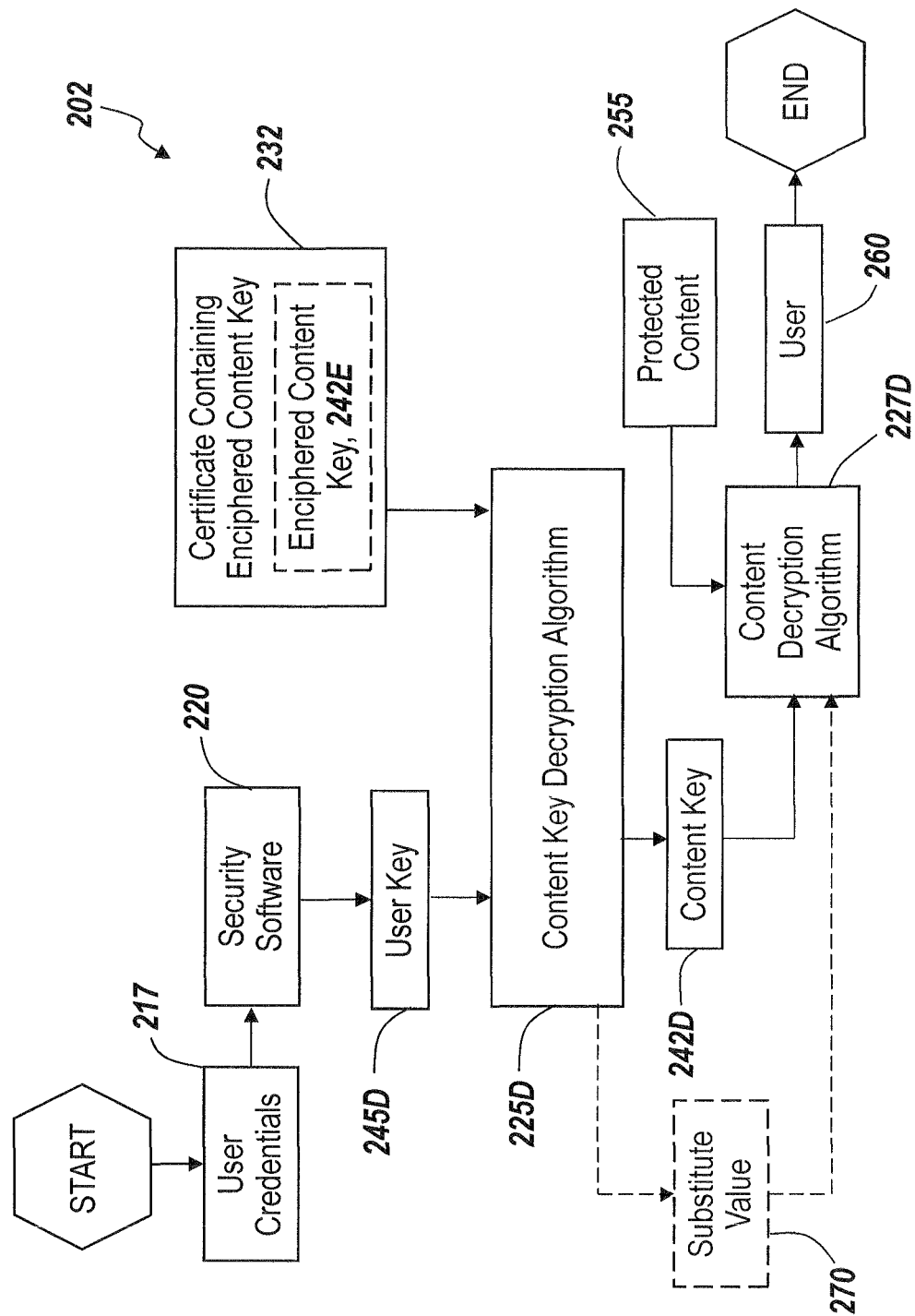
FIG. 7 is a diagrammatical illustration of a computer-implemented method of providing access to protected content with certificate-based access authorization, in accordance with the first embodiment of the present disclosure.

The access authorization method 200 of FIG. 6 is used to encipher the protected content 255 and create the certificate 230 used in access authorization. FIG. 7 illustrates the process through which a user can obtain access to the protected content 255 after it has been enciphered in the access authorization method 200 of FIG. 6. Accordingly, FIG. 7 is a diagrammatical illustration of a computer-implemented method of providing access to protected content 202 with certificate-based access authorization, in accordance with the first embodiment of the present disclosure. The computer-implemented method of providing access to protected content 202, which may be referred to herein simply as 'access authorization method 202' includes a number of steps executed on a processor of a computer.

With reference to FIGS. 6-7, the access authorization method 202 includes presenting a second set of user credentials 217 to a security program 220, which is stored, at least partially, on the memory of the computer. The second set of user credentials 217 may be the same or different from the set of user credentials 215 initially used in the access authorization method 200. For example, the second set of user credentials 217 would be the same as the set of user credentials 215 when the user attempting to gain access to the protected content 255 is the same user who supplied the user credentials 215 during enciphering of the protected content 255 i.e., an authorized attempt to access the protected content 255. If the second set of user credentials 217 differs from the set of user credentials 215 initially used, it may mean that the user attempting to gain access to the protected content 255 is not the user who supplied the initial user credentials 215, which could indicate that there is an unauthorized attempt to access the protected content 255. For clarity, this disclosure identifies credentials of the user distinctly as the set of user credentials 215 used in access authorization method 200 and the second set of user credentials 217 used in access authorization method 202, but it should be understood that the second set of user credentials 217 may match verbatim the set of user credentials 215, namely when the attempted accessing of the protected content 255 is authorized.

Now, rather than comparing the second set of user credentials 217 to the set of user credentials 215 stored in the certificate 230, as is conventionally used in content protection schemes, the security software 220 generates a second enciphered content key 242E using the credentials presented to it. Specifically, a second certificate 232 is presented to the security software 220, wherein the second certificate 232 has the second enciphered content key 242E. The second certificate 232 having the second enciphered content key 242E may be the same or different from the certificate 230 having the enciphered content key 240E, initially used in the access authorization method 200. For example, the second certificate 232 having the second enciphered content key 242E would be the same as the certificate 230 having the enciphered content key 240E when the user attempting to gain access to the protected content 255 is the same user who supplied the user credentials 215 during enciphering of the protected content 255, i.e., an authorized attempt to access the protected content 255. If the second certificate 232 having the second enciphered content key 242E differs from the certificate 230 having the enciphered content key 240E used in the access authorization method 200, it may mean that the user attempting to gain access to the protected content 255 is not the user who supplied the initial user credentials 215, which could indicate that there is an unauthorized attempt to access the protected content 255. For clarity, this disclosure identifies the certificate and enciphered content key distinctly as certificate 230 having the enciphered content key 240E used in access authorization method 200 and the certificate 232 having the second enciphered content key 242E used in access authorization method 202, but it should be understood that the second set of certificate 232 having the second enciphered content key 242E may match verbatim the certificate 230 having the enciphered content key 240E, namely when the attempted accessing of the protected content 255 is authorized.

Next, a decryption user key 245D is generated with the security program 220 using the second set of user credentials 217 presented and access authorization to the quantity of enciphered, protected content 255 is determined based on the decryption user key 245D. Determining access authorization to the quantity of enciphered, protected content 255 based on the decryption user key 245D is accomplished by decrypting the second enciphered content key 242E with the decryption user key 245D using a content key decryption algorithm 225D, which algorithm is stored within the second certificate 232, in response to a match of the decryption user key 245D with the user key 245E. This result may be achieved when the user is an authorized user, such that the credential in both method 200 and method 202 match. Accordingly, a quantity of protected content 255 may be decrypted with the decrypted content key 242D using a content decryption algorithm 227D, thereby providing user access to the quantity of protected content 255.

The access authorization method 202 allows for successful access to protected content 255 using a plurality of cryptographic keys having various corresponding certificates which are run through algorithms. In short, the security software 220 generates the second enciphered content key 242E, uses the second enciphered content key 242E via content key decryption algorithm 225D to decrypt the second enciphered content key 242E stored in the second certificate 232 to produce the decrypted content key 242D, and then uses the decrypted content key 242D to decrypt the protected content 255 via content decryption algorithm 227D. The resulting protected content 255 can then be accessed by user 260.

Figure 1:
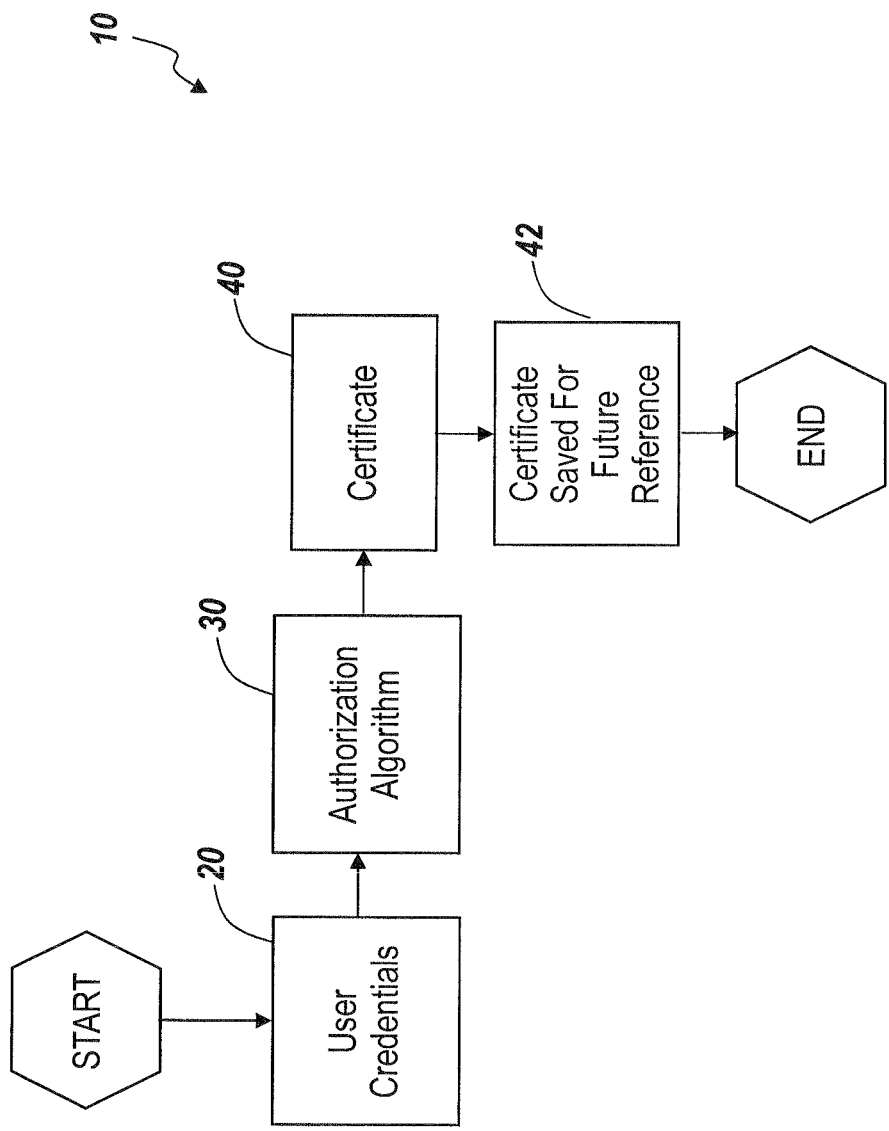
FIG. 1 is a diagrammatical illustration of access authorization steps of a conventional content protection scheme, in accordance with the prior art.
Figure 2:
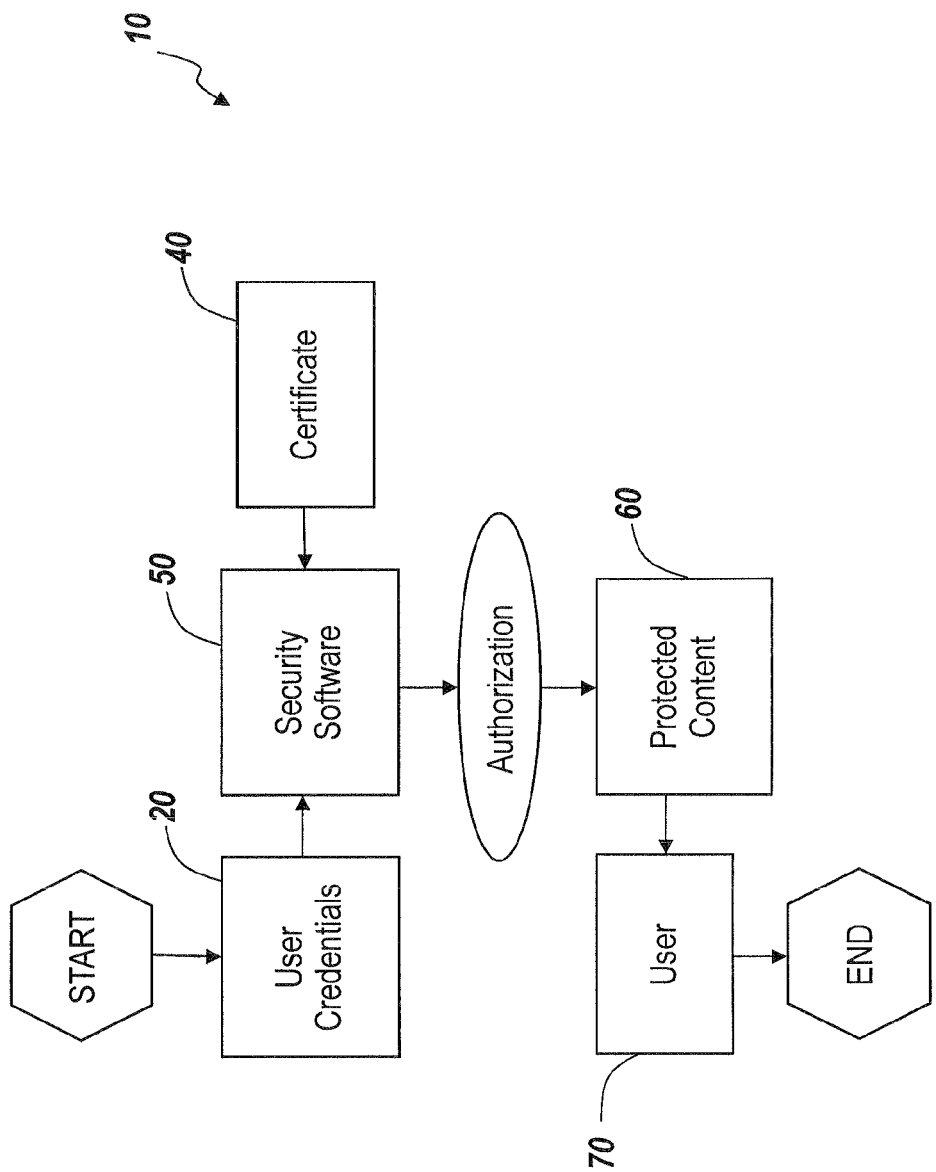
FIG. 2 is a diagrammatical illustration of a content access process of a conventional content protection scheme, in accordance with the prior art.

Unlike in the conventional content protection schemes 10 of FIGS. 1-2, the security software 220 of the access authorization method 202 of FIG. 7 is not responsible for accepting or rejecting the user's credentials. Rather, the security software 220 simply produces decryption user key 245D corresponding provided credentials 217 and uses those items to retrieve content key 242D from the certificate 232 and the second enciphered content key 242E from the certificate 232. Of course, the first and second keys may themselves be protected by yet another third set of credentials, and so on. That is to say, the invention can be applied to any dept of nesting desired by the implementer.

If the set of user credentials in 215 of FIG. 6 do not match the second set of user credentials 217 of FIG. 7 used to create the certificate 232, decryption user key 245D will not be identical or determined to be a "match" with the user key 245E, and thus content key decryption algorithm 225D will get no meaningful data when it attempts to decrypt the second enciphered content key 242E. Thus, second enciphered content key 242E will not match content key 240 used to encipher protected content 255 in FIG. 6, and any decrypted content will be meaningless.

Figure 3:
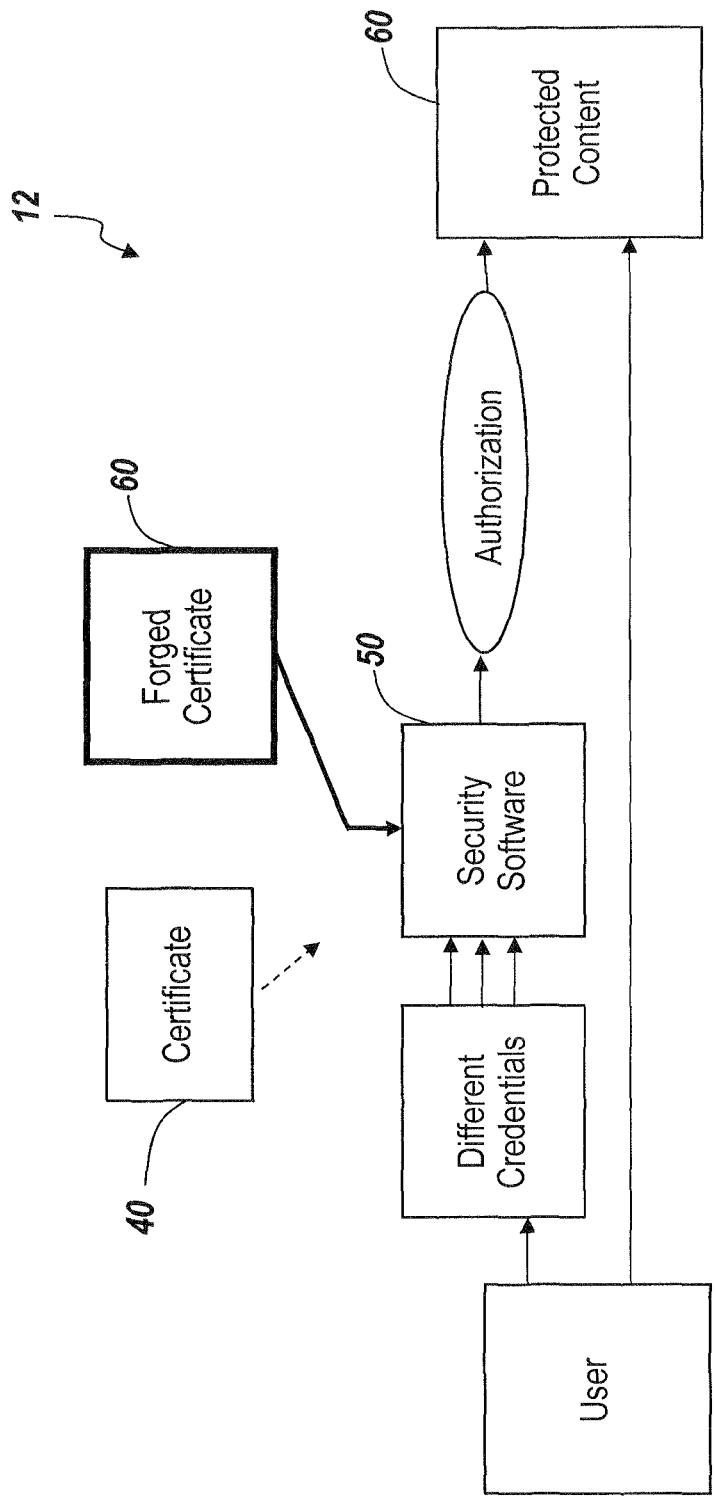
FIG. 3 is a diagrammatical illustration of a forged certificate attack against a conventional content protection scheme of FIGS. 1-2, in accordance with the prior art.
Figure 4:
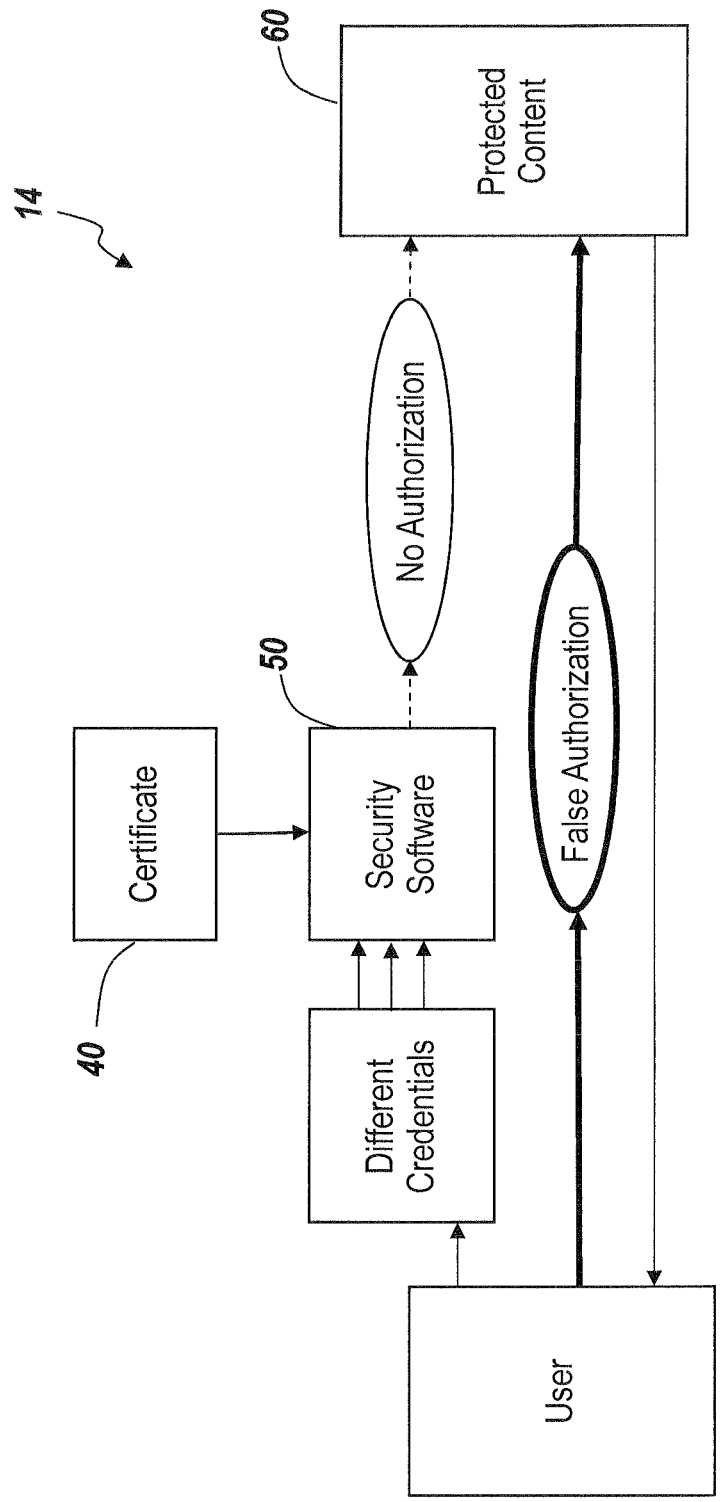
FIG. 4 is a diagrammatical illustration of a bypass attack against a conventional content protection scheme of FIGS. 1-2, in accordance with the prior art.

Accordingly, the access authorization methods 200, 202 of FIGS. 6-7 prevent many of the conventional attacks used to gain access to the protected content 255. A forged certificate attack 12 (FIG. 3) cannot be mounted against the subject methods because the attacker will lack content key 240 and thus does not have enough information to create a valid certificate 232 using new credentials. Similarly, the security software 220 cannot be bypassed or suppressed, as is shown in FIG. 4, because the protected content 255 is enciphered with content key 240, and the attacker will be unable to decrypt it without obtaining a cryptographic key based on the same user credentials. Thus, the attacker can be prevented from accessing the protected content directly. Assuming the cryptographic algorithms used in the access authorization methods 200, 202 are secure, it may be mathematically intractable for an attacker to access the protected content 255 without the correct credentials.

The content key 240 may be provided as a fixed key for content enciphered in advance of the access authorization method 200 starting or the content key 240 can be chosen (enciphered) at the time of user authorization, when the certificate 230 is generated, during the access authorization method 200. In either situation, the content key 240 may be arbitrarily chosen by the provider of the protected content 255 within the constraints of encryption algorithm 227E. The set of user credentials 215 may be provided to the user at a variety of times, such as during an initial sign-up or authorization of the user. The set of user credentials 215 may also be provided by the user using a hash function, such as a cryptographic hash function which receives the set of user credentials 215 as an input and returns a fixed-size alphanumeric string, or hash value.

As stated, if the credentials 215 do not match the second set of user credentials 217, the second enciphered content key 242E will not match content key 240 used to encipher protected content 255, and any decrypted content will be meaningless. Rather than omitting an output based on this failure in matches, another feature of the access authorization methods 200, 202 allows a substitute value 270 purporting to be decrypted content key 242D to still be produced by the algorithm. This substitute value 270 is produced even if the input values are incorrect, e.g., in response to a non-match of the decryption user key with the user key. The substitute value 270 does not decrypt the second enciphered content key 242E, and thus, prevents access to the protected content 255.

In an exemplary implementation of the access authorization methods 200, 202, all of the user's credentials (the set of user credentials 215 and/or the second set of user credentials 217) may be combined into a single cryptographic key. Decryption of the single cryptographic key will fail if the user presents credentials that differ in any way from those used when creating the certificate (certificate 230 and/or certificate 232). However, any of several well-known "secret-sharing" algorithms can be used to divide the cryptographic data among several credentials, so that the second enciphered content key 242E can be recovered even if only some of the credentials match those used in creating the certificate 230.

Accordingly, rather than creating a single user key 245E and using it to encrypt the entire content key 240, the content key 240 may be divided into several shares. The term, 'shares' may be understood to be portions or segments of the content key 240 with weighted percentages of the cumulative whole of the content key 240. A user with at least a certain number of shares, the required number can be predetermined or chosen arbitrarily, may be able to recover the complete decrypted content key 242D, but anyone with less than that combined number of shares would be unable to recover or decrypt content key 242D. Thus, a partial match of the set of user credentials 215 with the second set of user credentials 217, where the partial match is based on a division of the content key 240 into the shares, may facilitate a match of the second enciphered content key 242E with at least a portion of shares, and thus allow access to the protected content 255. There are a number of well-known ways to achieve share-based division of a cryptographic key, including but not limited to Shamir's scheme (based on polynomials), Blakley's scheme (based on hyperplanes), and Mignotte's and Asmuth-Bloom's Schemes (based on the Chinese Remainder Theorem).

Each share may be enciphered with a different user key, generated from some, but not all, of the set of user credentials 215. The shares are then distributed in such a way that a user with more of the original credentials can recover more of the shares. Optionally, some aspects of the set of user credentials 215 can be given greater weight by tying them to more of the shares. When the user attempts to access the protected content 255, the security software 220 may recover as many shares as possible based on the credentials the user presents. If the security software 220 receives enough correct credentials, it may recover a sufficient number of shares to reproduce the content key 240 and decipher the protected content 255. If not, then due to the mathematical properties of the secret-sharing scheme, the security software 220 will have no useful information about the content key 240, and thus will be unable to decrypt the protected content 255.

In access authorization methods 200, 202 of FIGS. 6-7, the set of user credentials 215 and the second set of user credentials 217 may be obtained using several different methods. For example, one method may obtain the same credentials each time the access authorization methods 200, 202 are run. In another method, the set of user credentials 215 and/or the second set of user credentials 217 may be obtained using a decision process based on an external value, wherein the external value is deterministic, random, or a combination thereof. In this method, the external value may provide the access authorization methods 200, 202 with a list of credentials which it should use in performing the algorithms of the access authorization methods 200, 202.

The access authorization methods 200, 202 may also use algorithms that themselves utilize an identifier of a computer associated with the user, or associated with another entity, where the identifier is incorporated into the algorithm. For example, the algorithms may use a hard disk serial number of the memory, a CPU serial number of the computer, a make of the computer, a model of the computer, a hardware key, an authentication server, or any combination thereof. For example, when used with a computer, the algorithm could obtain a hard disk serial number, CPU serial number and make/model of the computer based on certain configuration information or on an externally provided command from a license repository. Another example of a value that could be used by the algorithm would be a unique value derived from one or more device hardware and software characteristics, including but not limited to a Universal Unique Identifier (UUID) as exemplified by the UUID provided by the Apple iPhone Operating System to applications running on that platform; analogous values will exist on other hardware and software platforms. The actions included in this process could involve communicating with various devices that are either attached to the end-user system, such as hardware keys, or located remotely, such as authentication servers. When a decision process is applied to set of user credentials 215 in the access authorization method 200, it may be additionally required that sufficient information be preserved on the end-user system in some manner such that the end-user system can replicate and obtain the proper set of credentials, i.e., the second set of user credentials 217, again when attempting to access the protected content 255.

Similarly, the content of any given credential value could be obtained in more than one manner. This process can be done in a manner which is always the same, or it may differ on different runs of the algorithm, depending on the design. For example, one instantiation of an algorithm might obtain a hard disk serial number by reading data directly from the hard disk itself on one run, and the next time obtain the same information by making a request to the computer operating system. The system may, at its discretion, or if the conditions are set by the controller side (which may be human, an automated set condition, or a predetermined algorithmic boundary), or decide to obtain only a portion of the information used in creating the seed originally, or decide to obfuscate the information prior to presenting it as a credential for the user.

It is noted that rather than a single technique or algorithm, the access authorization methods 200, 202 can be a general set of rules and guidelines with specific design requirements such that they produce results with particular characteristics. When referring to a "cryptographic algorithm" or "encryption method" or "protection scheme" herein, it should not imply that access authorization methods 200, 202 are restricted to using only one possible mechanism for manipulating the designated data or permitting access to specific content. The access authorization methods 200, 202 can exist in at least one actual instantiation in some embodiments and can also exist in an unlimited number of other, equally viable instantiations in other embodiments.

Further, any reference made to an "end-user system" is intended to be construed in the broadest possible sense which includes but is not limited to one or more computer systems running a version of a digital content protection algorithm. For example, one possible embodiment of an end-user system might be a desktop computer running a graphics processing software program that is designed to access protected content and which therefore incorporates a digital content protection algorithm. A "user" may be a human user of a computer system or an electronic or other artificial entity. Another example of a possible embodiment would be a mobile device such as a phone or tablet computer running a version of a digital content protection algorithm.

The term "content" or "protected content" is used herein to mean the digital data elements, in whatever form they may exist, to which the end-user system desires one or more forms of access. Such content could include, but is not limited to, word processing documents, image files, video files, or web pages. Such content could also include meta-data such as lists of one or more digital data elements or lists of one or more hyperlinks (uniform resource locators, or URLs) for such digital data elements. Yet another example of such content could include meta-data unique to the content or the user, such as viewing preferences, device characteristics, network provisioning parameters, content priority for caching purposes, and any other data that could be of value to the user of the content.

In some embodiments of the access authorization methods 200, 202, items termed "credentials" are digital data elements identifying the user, including but not limited to passwords, biographical information, hardware information or license certificates. Said credentials are used by a content protection scheme to create items termed "certificates" indicating what access is to be permitted when the same credentials are presented in the future. Items termed "authorization algorithms," "security software" and other similar elements are understood to be algorithms which initiate actions or invoke processes or mechanisms that cause the sequences comprising the designated algorithms to be followed.

This disclosure also provides for a non-transitory computer-readable medium for controlling access to protected content stored on a memory of a computer with certificate-based access authorization based on instructions stored on the memory. Such a non-transitory computer-readable medium may include any of the hardware or software components discussed relative to FIG. 5 herein. When the instructions are executed by a processor, they may perform the steps of the access authorization method 200 and/or the access authorization method 202.

The access authorization methods 200, 202 may find many uses in the protection of digital content in a variety of industries and offer significant benefits against attacks to gain access to the protected content via unauthorized means. At a most basic level, the form of security provided by the access authorization methods 200, 202 may prevent illicit sharing and access of unauthorized content. However, a greater feature may be in the inherent capability to completely change the monetization and user interaction with digital entertainment content, as well as radically change the model with which content of any kind is shared on a peer-to-peer basis.

Content security, unlike most forms of IP and content protection, may be encoded on a per-item basis, embedding the user's "footprint" within the content on a binary level in two distinct forms at the time of initial authorization and access. When using the access authorization methods 200, 202, each piece of content may be generated 'on the fly' after authorization for the user at the time of purchase. The raw, unencoded files may be embedded at a binary level with some form of the user's ID on a per increment basis before being compiled into a complete package that is embedded with the user ID as the unlock key. The per increment basis, may include, for example, embedding the files to each page in a book, each image, each page in a classified document, each page of data, or each frame in a video or film. On a security basis, the end user cannot simply "go around" the lock on the "front door", as the specific user key has to successfully go through not only the "front door", but also through each designated increment of the package in order for the "unlock" to be successful. Put in other terms, in order for a user to "hack" a piece of content, they would also need to hack a version of the client application on a per-piece-of-content basis.

As an example, the access authorization methods 200, 202 may work in conjunction with watermarking techniques that imprint files at bit-level depths of protected content which can be used to identify authorized users of the protected content who purchased the protected content on a per-user-per-device basis. This method of watermarking may be highly resistant to any tampering, and may not be discernible to the naked eye, even on high-resolution screens. When these watermarking techniques are used with the access authorization methods 200, 202, the user who was the original source of the protected content and the user's authorized device on which the content was originally purchased can be identified. This ability provides significant benefits over merely being able to identify the protect content itself, or the platform it was retrieved from.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. For example, user credentials may include GPS allowed areas, and allowed time windows for accessing a file. Also, a mask file could be inserted to protect content in the event of a security breach, or the mask may be incorporated into the file. All such modifications and variations are intended to be included herein within the scope of this disclosure and the present disclosure and protected by the following claims.

What is claimed is:

1. A computer-implemented method of controlling access to protected content with certificate-based access authorization, the method comprising executing on a processor the steps of:

enciphering a quantity of protected content stored in a memory of a computer using a content key to produce a quantity of enciphered, protected content, wherein the content key is derived from a content encryption algorithm;

deriving a user key from a set of user credentials using a credential encryption algorithm; and enciphering the content key with the user key using a content key encryption algorithm to produce a certificate, wherein the certificate contains the enciphered content key, wherein at least one of the content encryption algorithm, the credential encryption algorithm, and the content key encryption algorithm is derived from an authentication server.

2. The computer-implemented method of claim 1, wherein the content key is chosen by a provider of the quantity of protected content within constraints of the content encryption algorithm.

3. The computer-implemented method of claim 1, further comprising supplying the set of user credentials by the user.

4. The computer-implemented method of claim 3, wherein supplying the set of user credentials by the user further comprises using a cryptographic hash function.

5. The computer-implemented method of claim 1, wherein the certificate does not contain either the set of user credentials or the user key.

6. The computer implemented method of claim 1, wherein deriving the content key further comprises at least one of:
providing the content key as a fixed key; and
choosing the content key at a time of user authorization.

7. The computer implemented method of claim 1, further comprising:
presenting a second set of user credentials to a security program, wherein the security program is stored, at least partially, on the memory of the computer;
presenting a second certificate containing a second enciphered content key to the security program;
generating a decryption user key with the security program using the second set of user credentials presented; and
determining access authorization to the quantity of enciphered, protected content based on the decryption user key.

8. The computer implemented method of claim 7, wherein determining access authorization to the quantity of enciphered, protected content based on the decryption user key further comprises:
decrypting the second enciphered content key with the decryption user key using a content key decryption algorithm in response to a match of the decryption user key with the user key; and
decrypting a quantity of protected content with the decrypted content key using a content decryption algorithm, thereby providing user access to the quantity of protected content.

9. The computer implemented method of claim 8, wherein a match of the decryption user key with the user key further comprises a match of the set of user credentials with a second set of user credentials.

10. The computer implemented method of claim 9, wherein the match of the decryption user key with the user key further comprises a partial match of the set of user credentials with the second set of user credentials, wherein the partial match is based on a division of the enciphered content key into a plurality of shares, wherein the second enciphered content key matches at least a portion of the plurality of shares.

11. The computer-implemented method of claim 8, wherein the content key decryption algorithm is stored within the second certificate.

12. The computer implemented method of claim 7, wherein determining access authorization to the quantity of enciphered, protected content based on the decryption user key further comprises producing a substitute value in response to a non-match of the decryption user key with the user key.

13. The computer-implemented method of claim 12, wherein the substitute value does not decrypt the second enciphered content key, wherein access to the quantity of protected content is rejected.

14. The computer-implemented method of claim 12, wherein the non-match of the decryption user key with the user key corresponds to a non-match of the set of user credentials with the second set of user credentials.

15. The computer-implemented method of claim 1, further comprising obtaining the set of user credentials using a decision process based on an external value, wherein the external value is at least one of deterministic and random.

16. The computer-implemented method of claim 1, wherein at least one of the content encryption algorithm, the credential encryption algorithm, the content key encryption algorithm, the content key decryption algorithm, and the content decryption algorithm utilizes at least one of: a hard disk serial number of the memory, a CPU serial number of the computer, a make of the computer, a model of the computer, a hardware key, a unique value derived from one or more device hardware and software characteristics, and an authentication server.

17. A computer-implemented method of providing access to protected content with certificate-based access authorization, the method comprising executing on a processor the steps of:
presenting a set of user credentials to a security program, wherein the security program is stored, at least partially, on a memory of a computer;
generating a user key with the security program using the set of user credentials presented;
presenting a certificate containing an enciphered content key to the security program, wherein the content key is derived from a content encryption algorithm which is derived from an authentication server, and wherein the content key is enciphered with the user key;
decrypting a content key with the user key using a content key decryption algorithm, wherein the content key decryption algorithm is stored within the certificate; and
decrypting a quantity of protected content with the decrypted content key using a content decryption algorithm, thereby providing user access to the quantity of protected content.

18. The computer-implemented method of claim 17, further comprising decrypting the content key with the user key using the content key decryption algorithm in response to a match of a previously decrypted user key with the user key.

19. A non-transitory computer-readable medium for controlling access to protected content stored on a memory of a computer with certificate-based access authorization, comprising instructions stored on the memory, that when executed on a processor, perform the steps of:
enciphering a quantity of protected content stored in a memory of a computer using a content key to produce a quantity of enciphered, protected content, wherein the content key is derived from a content encryption algorithm;
deriving a user key from a set of user credentials using a credential encryption algorithm; and
enciphering the content key with the user key using a content key encryption algorithm to produce a certificate, wherein the certificate contains the enciphered content key,
wherein at least one of the content encryption algorithm, the credential encryption algorithm, and the content key encryption algorithm is derived from an authentication server.

20. The non-transitory computer-readable medium of claim 19, further comprising the steps of:

presenting a second set of user credentials to a security program, wherein the security program is stored, at least partially, on the memory of the computer;

presenting a second certificate containing a second enciphered content key to the security program;

generating a decryption user key with the security program using the second set of user credentials presented; and determining access authorization to the quantity of enciphered, protected content based on the decryption user key by:

decrypting the second enciphered content key with the decryption user key using a content key decryption algorithm in response to a match of the decryption user key with the user key; and decrypting a quantity of protected content with the decrypted content key using a content decryption algorithm, thereby providing user access to the quantity of protected content.

21. The non-transitory computer-readable medium of claim 20, wherein the first and second keys are themselves protected by at least one other set of credentials.

\* \* \* \* \*